United States Patent
Pang et al.

(10) Patent No.: US 6,445,421 B1
(45) Date of Patent: Sep. 3, 2002

(54) METHOD AND APPARATUS FOR DISPLAYING THE SUBTITLE OF MULTIPLE LANGUAGE BETWEEN HUMAN-MACHINE INTERFACE

(75) Inventors: Chien Cheng Pang; Tsai Kun Shan, both of Shin-Chu (TW)

(73) Assignee: Mustek Systems, Inc., Shin-Chu (TW)

( * ) Notice: Subject to any disclaimer, the term of this patent is extended or adjusted under 35 U.S.C. 154(b) by 0 days.

(21) Appl. No.: 09/418,039

(22) Filed: Oct. 14, 1999

(51) Int. Cl.⁷ .................................... H09N 7/08
(52) U.S. Cl. ........................ 348/468; 348/564
(58) Field of Search ................... 348/468, 465, 348/563, 564, 565; 386/125; 704/8, 7

(56) References Cited

U.S. PATENT DOCUMENTS

| | | | |
|---|---|---|---|
| 4,122,533 A | * 10/1978 | Kubinak | 364/700 |
| 6,182,209 B1 | * 1/1998 | Vlot et al. | 712/233 |
| 5,818,935 A | * 10/1998 | Maa | 380/20 |
| 5,973,679 A | * 10/1999 | Abbott et al. | 345/302 |
| 6,124,854 A | * 9/2000 | Sartain et al. | 345/327 |
| 6,233,253 B1 | * 5/2001 | Settle et al. | 370/474 |
| 6,253,221 B1 | * 6/2001 | Kim | 707/536 |

FOREIGN PATENT DOCUMENTS

JP          200031845      * 1/2001

* cited by examiner

*Primary Examiner*—Victor R. Kostak
(74) *Attorney, Agent, or Firm*—McGuireWoods LLP

(57) ABSTRACT

The present invention relates to a method and apparatus for displaying subtitles by a multination language human-machine interface that having small memory space occupation and conveniently for program maintenance. First of all, a character database is been edited, and in accordance with the character size to edit the bitmap file for each individual character. The bitmap file is then transferred to 80c51xa assembly language and stored in the character database. Then, the "string code", the "string combination code", and the "string combination code of multination language" of the controlling program are established, and the content of the character database is been called. During a practical usage, the desired string is been called by the controlling program, then carried out the language judgement of the exercising nation. Next, in accordance with the characters included in the desired string, extracting from the character database, drawing the string and showing on the screen eventually.

12 Claims, 7 Drawing Sheets

| SETUP | IMAGE | AUDIO | MEETING |
|---|---|---|---|
| SOURCE: PC/MAC \| VIDEO \| S-VIDEO | BRIGHTNESS | VOLUME | DISP. TOOLS: OFF \| POINTER \| CURTAIN |
| VIDEO: NTSC \| PAL \| SECAM | CONTRAST | BALANCE: L \| R | BACKDROP: OFF \| ON |
| PROJECTION: R \| R \| R \| R | HORIZONTAL SIZE | BASS: − \| + | BACKDROP COLOR: ◁ 1 2 3 ▷ |
| MENU COLOR: 1 2 3 4 | TRACK | TREBLE: − \| + | CURTAIN COLOR: ◁ 1 2 3 ▷ |
| MENU TONE: OFF \| ON | XGA RESIZE: OFF \| ON | MUTE: OFF \| ON | ZOOM: OFF \| ON |
| AUTO OFF: MIN. 90 | DEFAULT: NO \| YES | DEFAULT: NO \| YES | FREEZE: OFF \| ON |
| LANGUAGE: ◁ NL \| ENG \| FRE ▷ | | | SET DURATION: MIN. 45 |
| | | | SHOW DURATION: OFF \| ON |

| CONFIG. | IMAGE | AUDIO | RÉUNION |
|---|---|---|---|
| SOURCE: PC/MAC \| VIDEO \| S-VIDEO | LUMINOSITÉ | VOLUME | OUTILS: HORS \| POINT. \| RIDEAU |
| VIDÉO: NTSC \| PAL \| SECAM | CONTRASTE | BALANCE L / R | FOND UNI: HORS \| EN |
| PROJECTION: R \| Я \| R \| Я | COULEURS | BASSES − / + | COUL. FOND UNI: △ 1 2 3 ▽ |
| COUL. MENU: 1 \| 2 \| 3 \| 4 | TINT | AIGUËS − / + | COUL. RIDEAU: △ 1 2 3 ▽ |
| TEINTE MENU: HORS \| EN | CORR. GAMMA: HORS \| EN | MUET: HORS \| EN | ZOOM: HORS \| EN |
| COUP. AUT: 90 MIN. | DÉFAUT: NON \| OUI | DÉFAUT: NON \| OUI | ARR. S/M: HORS \| EN |
| LANGUE: △ ENG \| FRE \| DEU ▽ | | | RÉGLAGE DURÉE: 45 MIN. |
| | | | AFF. DURÉE: HORS \| EN |

| EINRICHT. | BILD | AUDIO | MEETING |
|---|---|---|---|
| QUELLE: PC/MAC \| VIDEO \| S-VIDEO | HELLIGKEIT | LAUTST | WERKZ EINBL.: AUS \| ZEIGER \| VORH. |
| VIDEO: NTSC \| PAL \| SECAM | KONTRAST | BALANCE: L \| R | HINTERGR: AUS \| EIN |
| PROJEKTION: R \| Я \| Я \| R | FARBE | BÄSSE: − \| + | HINTERG-ARBE: ◁ 1 2 3 ▷ |
| MENÜ FARBE: 1 \| 2 \| 3 \| 4 | FARBTON | HÖHEN: − \| + | FARBE VORHANG: ◁ 1 2 3 ▷ |
| MENÜ FARBTON: AUS \| EIN | GAMMA KORR: AUS \| EIN | STUMM: AUS \| EIN | ZOOM: AUS \| EIN |
| AUTO ABS: MIN. 90 | STANDARD: NEIN \| JA | STANDARD: NEIN \| JA | EINFRIEREN: AUS \| EIN |
| SPRACHE: ◁ FRE \| DEU \| ITA ▷ | | | DAUER EINST.: MIN. 120 |
| | | | DAUER ANZ.: AUS \| EIN |

*FIG. 4* character database :
naming rule  character(C)_form size(B,M,L)_letters(A..Z , 0..9)

Example : (80c51xa assembly language code)
(1) big letter :
    C_B_A:
        DW      00013H, 00011H, 00011H
        DW      001e0H, 000f0H, 000fcH, 0007eH, 0007fH
        DW      08039H, 0c01cH, 0e01cH, 0380eH, 01c07H
        DW      00e07H, 0ff83H, 0ffc3H, 0c0f1H, 0c038H
        DW      0e01cH, 0e007H, 07003H, 08000H
    C_B_B:
        DW      00010H, 0000fH, 00011H
        DW      07fe0H, 0fff1H, 0c0f3H, 080e7H, 001ceH
        DW      0039cH, 00e3fH, 0fc7fH, 0f8e0H, 079c0H
        DW      03b80H, 07700H, 0ee01H, 0dc07H, 03ffeH
        DW      07ff0H
(2) medium letter :
    C_M_A:
        DW      00007H, 0000aH, 0000bH
        DW      00c07H, 081e0H, 07833H, 00cc6H, 019feH
        DW      061b0H, 03c0cH
    C_M_B:
        DW      00007H, 00009H, 0000bH
        DW      0ff60H, 0f078H, 03c37H, 0fb07H, 083c1H
        DW      0e0ffH, 0c000H
(3) small letter :
    C_L_A:
        DW      00004H, 00007H, 00009H
        DW      03851H, 0b224H, 04fb1H, 0c182H
    C_L_B:
        DW      00004H, 00006H, 00009H
        DW      0fa38H, 063faH, 03863H, 0f800H
(4) numeric :
    C_L_0:
        DW      00004H, 0000 6H, 00009H
        DW      07b3cH, 0f3cfH, 03cf3H, 07800H
    C_L_1:
        DW      00003H, 00004H, 00009H
        DW      037f3H, 03333H, 03000H

FIG. 6

METHOD AND APPARATUS FOR DISPLAYING THE SUBTITLE OF MULTIPLE LANGUAGE BETWEEN HUMAN-MACHINE INTERFACE

BACKGROUND OF THE INVENTION

1. Field of the Invention

The present invention relates to an improved method and apparatus for displaying subtitles by a multination language human-machine interface, and more particularly, to an improved method and apparatus for displaying subtitles by a multination language human-machine interface that having small memory space occupation and conveniently for program maintenance.

2. Description of the Prior Art

FIG. 1 shows the technological flowchart for displaying the subtitle of multination language human-machine interface by the conventional monitors. First of all, the basic concept would be gradually setting up the string (step 110) and the location of the string list (step 120) for every different country, and then forming as a bitmap file (step 130). Finally, the above bitmap file is transferred to 80c51xa assembly language, where the assembly language used by chips will be programmed (step 140) and also provide the use of controlling program for the screen displaying control. Wherein the string been displayed on monitors is handled by the method of uniformly lining up to the left of the list.

Three sorts of different language subtitle, such as English, Germany and French, been displayed on monitors are shown in FIGS. 2, 3 and 4 respectively. The conventional method for displaying the synonymous string of the same list in those three figures, such as "SETUP" in English, "CONFIG." in French, and "EINRICHT" in German, is firstly to edit the character strings of those three languages individually. Each character string will be uniformly lined up to the left of the list and drawn to its bitmap file, as well as transferred to its 80c51xa assembly language relatively. Therefore, there is a need to draw a relative bitmap file for every different country and for every different string list. Hence, at least two drawbacks have been introduced by the conventional method: (1) A huge bitmap file database for the strings consumes a large amount of the programmed memory; and (2) any addition or correction of a string in the list would result in a redraw of the relative bitmap file, hence making a hassle to the program maintenance. Consequently, an improved method and apparatus for displaying subtitles of multination language human-machine interface that substantially occupies smaller memory space and easy for program maintenance is provided.

SUMMARY OF THE INVENTION

An objective of the present invention is to transfer the requiring characters, figures, and symbols to a character database, that is provided to be called by a controlling program and been used in a combination in achieving the target of saving memory space. In another objective of the present invention, as referring to a same meaning of multination language strings in different lengths, and in accordance with the character number of the "string combination code of multination language", the combination of the relative string length and the calling usage for the character database can be adjusted elastically. In a further objective of the present invention, a fixed information structure of strings makes maintenance and adjustment easier. In a last objective of the present invention, the controlling program and the information structure are easy to be adjusted while the microprocessor is been replaced.

The principle technological thoughts of the present invention are: (1) A country selection program is designed within the human-machine interface system, which is capable in transferring the subtitle into the relative different nation's language. (2) Characters used by many different nations' language, such as English, French, German, etc., are repeated in a great amount, this characteristic can be specified as to provide repeats in calling usage for the controlling program while building up the character database.

The present invention relates to a method and apparatus for displaying subtitles by a multination language human-machine interface. First of all, a character database is been edited, and in accordance with the character size to edit the bitmap file for each individual character. The bitmap file is then transferred to 80c51xa assembly language and stored in the character database. Then, the "string code", the "string combination code", and the "string combination code of multination language" of the controlling program are established, and the content of the character database is been called. During a practical usage, the desired string is been called by the controlling program, then carried out the language judgement of the exercising nation. Next, in accordance with the characters included in the desired string, extracting from the character database, drawing the string and showing on the screen eventually.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 indicates English subtitle displaying screen by a multination language human-machine interface;

FIG. 3 indicates French subtitle displaying screen by a multination language human-machine interface;

FIG. 4 indicates German subtitle displaying screen by a multination language human-machine interface;

FIG. 6 is the character database used by the present invention;

DESCRIPTION OF THE PREFERRED EMBODIMENT

Figure 1:
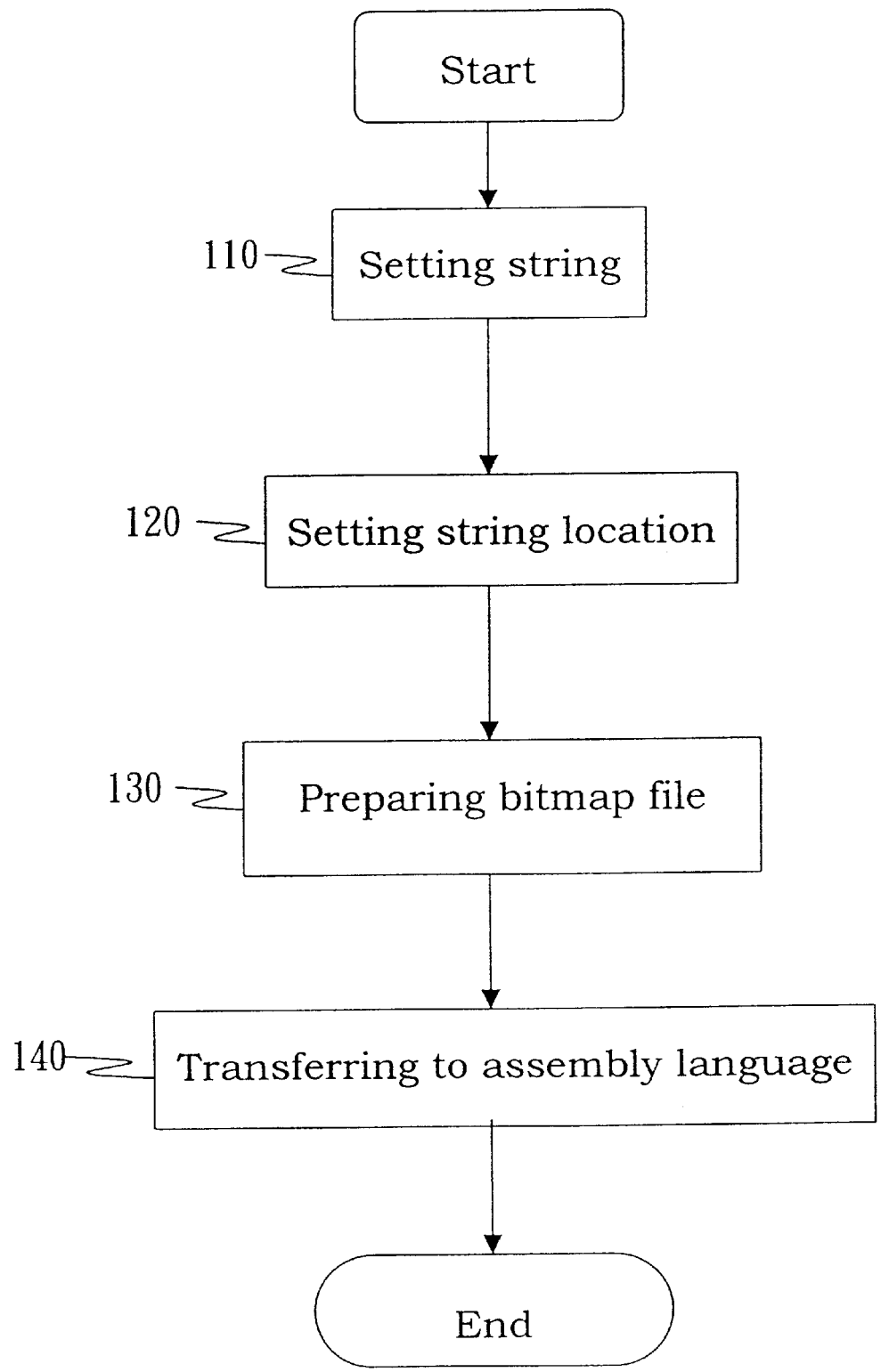
FIG. 1 shows the conventional technological flowchart for displaying the subtitle by a multination language human-machine interface.
Figure 5:
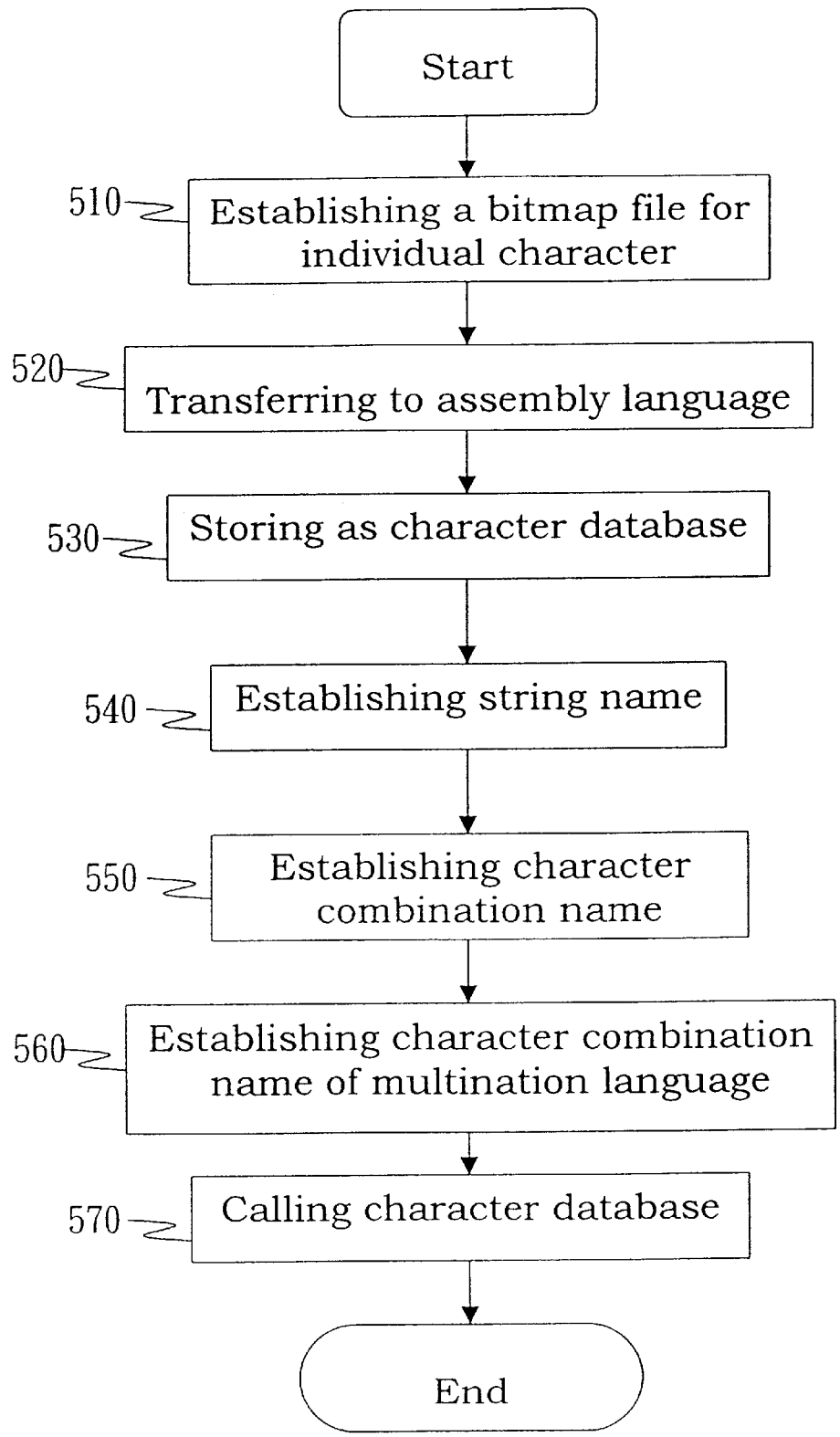
FIG. 5 shows the flowchart of establishing the information structure of the present invention.
Figure 7:
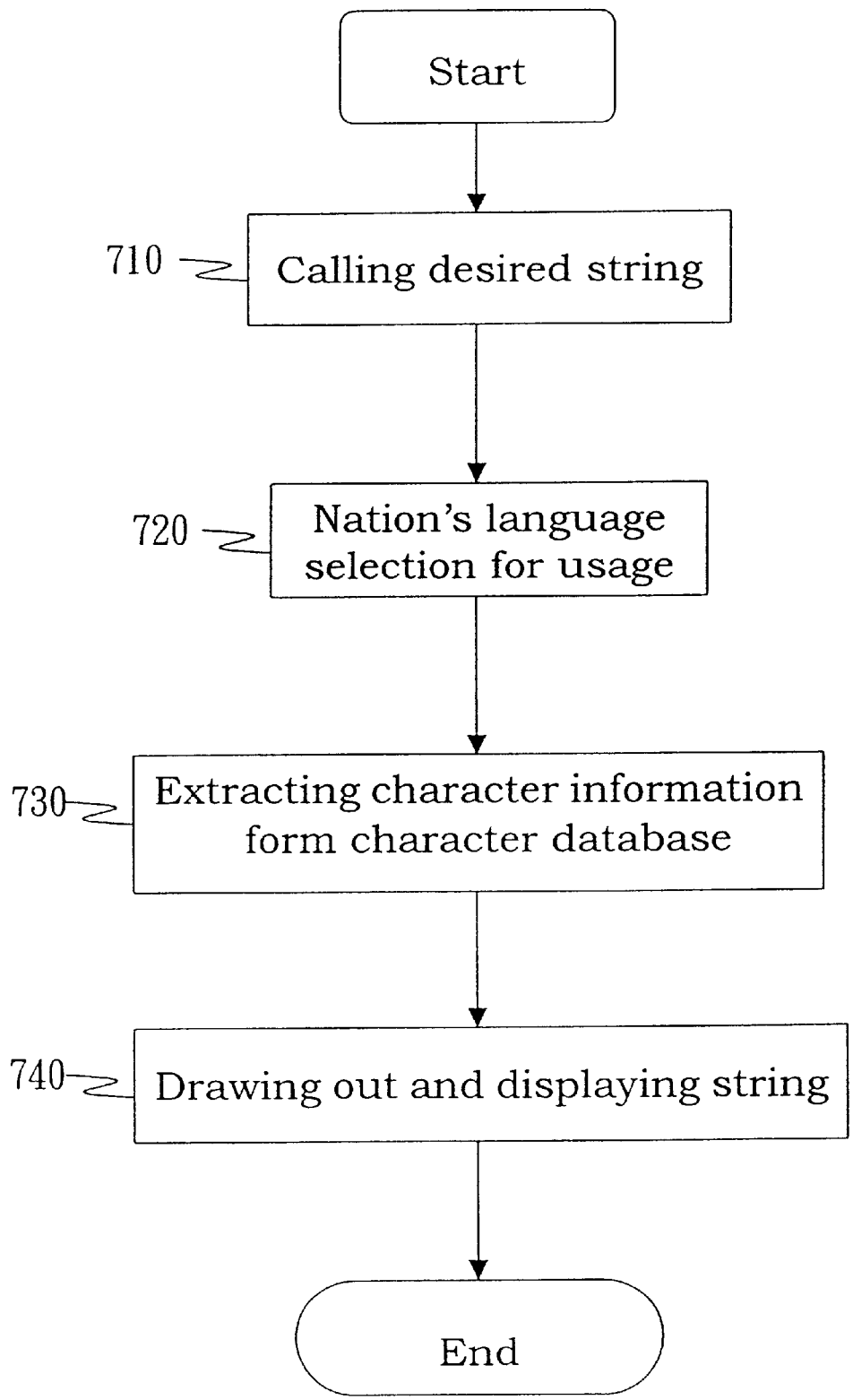
FIG. 7 shows the technological flowchart of an improved method and apparatus for displaying subtitles by a multination language human-machine interface of the present invention.

First of all, the information structure been used by the present invention is been illustrated, where FIG. 5 shows the flowchart of establishing the information structure of the present invention. Procedure 1 is to edit a character database, and in accordance with the character's size and symbol to edit the bitmap file for each individual character (Step 510). The bitmap file is then transferred to 80c51xa assembly language format (Step 520) and stored in the character database (Step 530) for providing repeats in calling usage of the controlling program. Procedure 2 is to establish the "string code" (Step 540) and the "string combination code" (Step 550) of the controlling program. Next, Procedure 3 is to establish the "string combination code of multination language" (Step 560) within the "string combination code". The last procedure is to call and exercise the character database contents (Step 570) in accordance with "string combination code of multination language". FIG. 6 is the character database used by the present invention.

The following program exemplification is based on three commonly used international languages, that are, English, French and German, where the program for different nations' language selection and the character bitmap file of the calling character database for the present invention is shown. The first step of program model is to define the string code and character combination code. Normally the character combination code of multiple language is defined after the combination code of character defined. And then the necessary character number and the character database for substantially calling are all defined. Therefore the whole program is written as the following:

Setup_str:
   DW STRING, S_Setup;
   DW 80H
S_Setup:
   DW ENG_Setup, FRE_Setup, Deu_Setup;
ENG_Setup: (character section)
   DW C_B_S, C_B_E, C_B_T, C_B_U, C_B_P;
FRE_Setup:
   DW C_B_C, C_B_O, C_B_N, C_B_F, C_B_I, C_B_G, C_B_Dot;
Deu_Setup:
   DW C_B_E, C_B_I, C_B_N, C_B_R, C_B_I, C_B_C, C_B_H, C_B_T, C_B_Dot;
Wherein:
   "Setup-str": String code is announced;
   "DW STRING, S_Setup": Call string combination code program and process the selection of nation's language for inputting string;
   "DW 80H": ending;
   "S_Setup": Announce the string combination code of multination language;
   "DW ENG_Setup, FRE_Setup, Deu_Setup": Calling to input string that relates to the character combination program of the nation's language;
   "ENG_Setup": English character section announces;
   "FRE_Setup": French character section announces;
   "Deu_Setup": Germany character section announces;
   "DW C_B_S, C_B_E, C_B_T, C_B_U, C_B_P": Calling SETUP character from the character database, wherein, C_ is the calling of character database, B_s the calling of capital form for every letter, L_ is the calling of lower case letter;
   "DW C_B_C, C_B_O, C_B_N, C_B_F, C_B_I, C_B_G, C_B_Dot": Calling CONFIG. character from the character database;
   "DW C_B_E, C_B_I, C_B_N, C_B_R, C_B_I, C_B_C, C_B_H, C_B_T, C_B_Dot": Calling EI NRI.CT. character from the character database.

FG. 7 shows the technological flowchart of an improved method and apparatus for displaying subtitles by a multination language human-machine interface of the present invention. First of all, the desired string is been called by the controlling program (Step 710), then carried out the language judgement of the exercising nation (Step 720). Next, in accordance with the characters included in the desired string, extracting from the character database (Step 730), drawing the string and showing on the screen eventually (Step 740). Moreover, the present invention can take the advantage of application specific integrated circuit (ASIC) and micro-controller to use for any sort of the screen of audio facility such as TV, projector, DVD player and Audio/Video System.

While the invention has been described by way of examples and in terms of one preferred embodiment, it is to be understood that the invention need not be limited to the disclosed embodiments. On the contrary, it is intended to cover various modifications and similar arrangements included within the spirit and scope of the appended claims, the scope of which showed be accorded the broadest interpretation so as to encompass all such modifications and similar structures.

What is claimed is:

1. A method for displaying a subtitle of a certain language selected from a plurality of different languages on a display device, said subtitle in any of said different languages including at least one strings of characters in the corresponding language, said method comprising steps of:

editing each of said characters in each of said different languages into an individual file wherein characters of the same contents for said different languages are edited into the same individual file;

establishing a character database for said individual files;

extracting relevant characters from said character database when a desired string of characters of said certain language is called in response to the user's command; and combining said relevant characters as said desired string of characters and displaying said desired string of characters on said displaying device.

2. The method according to claim 1 wherein said individual file is a bitmap file.

3. The method according to claim 2 further comprising a step of storing said bitmap file in an 80c51xa assembly language format.

4. The method according to claim 1 wherein in said editing step, characters of the same contents for said different languages are edited into the same individual file.

5. The method according to claim 1 further comprising steps of establishing a string code representing the content of said desired string of characters, and establishing a string combination code of multination language for correlating said different languages of the same string code.

6. The method according to claim 5 wherein said extracting step is executed by calling a string combination code program to select characters according to said string code and string combination code of multination language, and calling said selected characters from said character database.

7. The method according to claim 1 being performed by a micro-controller of said displaying device.

8. The method according to claim 1 being performed by an application specific integrated circuit (ASIC).

9. The method according to claim 1 wherein said displaying device is an Audio/Video System.

10. The method according to claim 1 wherein said displaying device is a television.

11. The method according to claim 1 wherein said displaying device is a projector.

12. The method according to claim 1 wherein said displaying device is a DVD player.

* * * * *